(12) United States Patent
Chou et al.

(10) Patent No.: US 7,346,168 B2
(45) Date of Patent: Mar. 18, 2008

(54) METHOD AND APPARATUS FOR SECURE WIRELESS DELIVERY OF CONVERGED SERVICES

(75) Inventors: Wu Chou, Basking Ridge, NJ (US); Juan Jenny Li, South Orange, NJ (US); Feng Liu, Hillsborough, NJ (US); Xueshan Shan, Orefield, PA (US)

(73) Assignee: Avaya Technology Corp., Basking Ridge, NJ (US)

( * ) Notice: Subject to any disclaimer, the term of this patent is extended or adjusted under 35 U.S.C. 154(b) by 744 days.

(21) Appl. No.: 10/674,285

(22) Filed: Sep. 29, 2003

(65) Prior Publication Data

US 2005/0071674 A1 Mar. 31, 2005

(51) Int. Cl.
*H04L 9/00* (2006.01)
(52) U.S. Cl. .......................... 380/270; 726/21; 726/26
(58) Field of Classification Search ................... 726/21
See application file for complete search history.

(56) References Cited

U.S. PATENT DOCUMENTS

| | | | |
|---|---|---|---|
| 6,230,205 B1 * | 5/2001 | Garrity et al. .............. | 709/231 |
| 6,292,827 B1 * | 9/2001 | Raz ............................. | 709/217 |
| 6,564,056 B1 | 5/2003 | Fitzgerald | |
| 6,591,102 B1 | 7/2003 | Chavez et al. | |
| 2002/0065074 A1 * | 5/2002 | Cohn et al. ................. | 455/422 |
| 2002/0090934 A1 * | 7/2002 | Mitchelmore .............. | 455/412 |
| 2002/0193131 A1 | 12/2002 | Fleshler et al. | |
| 2003/0032409 A1 * | 2/2003 | Hutcheson et al. ........ | 455/414 |
| 2003/0037261 A1 * | 2/2003 | Meffert et al. ............. | 713/201 |
| 2003/0156591 A1 * | 8/2003 | Sorsa ........................ | 370/401 |
| 2003/0159029 A1 | 8/2003 | Brown et al. | |
| 2004/0019900 A1 * | 1/2004 | Knightbridge et al. ........ | 725/23 |

(Continued)

FOREIGN PATENT DOCUMENTS

CA 2450601 12/2002

(Continued)

OTHER PUBLICATIONS

"WAP Push Architectural Review: Wireless Application Protocol Push Architectural Review" (1999).

(Continued)

*Primary Examiner*—Matthew B Smithers
(74) *Attorney, Agent, or Firm*—Ryan, Mason & Lewis, LLP

(57) ABSTRACT

A method and apparatus are provided for the secure delivery of converged services to users of wireless devices in a wireless environment. An application layer broker is positioned between the user devices and the application server to provide an indirect coupling between the enterprise application server and the wireless user devices. The application layer broker links the wireless environment to the enterprise application server through an event triggered content delivery mechanism without providing a direct link between the wireless user device and the enterprise application server. Delivered content can only be accessed by the intended user and the authorized device. The application layer broker provides adaptation to various user devices and the various capabilities associated with each user device. Wireless devices can be upgraded independently from upgrades to the application server. The decoupling performed by the application layer broker separates the service control, such as user registration from the service delivery.

20 Claims, 2 Drawing Sheets

U.S. PATENT DOCUMENTS

2004/0103297 A1* 5/2004 Risan et al. .............. 713/200
2004/0254993 A1* 12/2004 Mamas .................... 709/206

FOREIGN PATENT DOCUMENTS

WO     WO 03/043286 A    5/2003

OTHER PUBLICATIONS

"WAP Architecture: Wireless Application Protocol Architecture Specification", WAP-210-WAPArch-20010712 (2001).
Resource Description Framework (RDF) Model and Syntax Specification, W3C Recommendation, http://www.w3c.org/RDF/) downloaded Sep. 25, 2003.

* cited by examiner

METHOD AND APPARATUS FOR SECURE WIRELESS DELIVERY OF CONVERGED SERVICES

FIELD OF THE INVENTION

The present invention relates generally to communication methods and systems, and more particularly, to methods and systems for the secure delivery of multimedia content to wireless users.

BACKGROUND OF THE INVENTION

Wireless applications are increasing in popularity, due in large part to the mobility that wireless applications provide to users. The rapid advance of wireless technologies and protocols, however, has provided new challenges for providing secure service delivery of wireless content and adaptable software architectures. Security is a particularly important issue for wireless communications, where multiple levels of vulnerabilities come into play when designing and deploying wireless applications, such as interoperability issues and device security. Software design adaptability allows new technologies and mechanisms to be incorporated into a system quickly and easily without interrupting the existing operations. In addition, the introduction of more dynamic applications and richer content to the users of wireless devices has been further inhibited by the small memory footprints, low computing capabilities and reduced and widely varied screen sizes of wireless devices.

While traditional desktop applications in the wired world can normally assume access to a full range of capabilities, including a full-featured email client and a web browser, communication services and applications designed for wireless devices are often constrained by limited resources and processing capabilities. For example, wireless applications typically assume and provide for the existence of a two-way single-mode communication channel between the wireless device and the enterprise communication server. This two-way communication channel traditionally takes the form of an audio channel established through a telephone call. Services are typically delivered by first establishing a communication channel (i.e., by setting up a telephone call), and then engaging in an interaction with the user, leading him or her through some kind of a dialog. This framework links the user directly to the application in only a single mode and does not support on-line upgrades.

The direct link single mode connection, however, is not adequate for many applications, since it imposes undesired limitations on the end user experience and the richness of the content that may be delivered. Voice-based applications for mobile devices offer ease of input, but their inherent ephemeral quality limits their use as an output medium. A need therefore exists for a method and apparatus for delivery of converged services with audio, data or video content (or a combination thereof). A further need therefore exists for a method and apparatus for securely delivering such converged services to wireless device users in a wireless environment.

SUMMARY OF THE INVENTION

The present invention provides a method and apparatus for the secure delivery of converged services to users of wireless devices in a wireless environment. One or more wireless user devices communicate with one or more application servers over one or more wireless links. According to one aspect of the invention, an application layer broker is located between the wireless user devices (client) and the application server to provide an indirect coupling between the enterprise application server and the wireless user devices. Generally, the application layer broker links the wireless environment to the enterprise application server through an event triggered content delivery mechanism without providing a direct link between the wireless user device and the enterprise application server.

According to another aspect of the invention, the event triggered content delivery mechanism allows the enterprise application server to perform user authentication, dialogue interaction, and service queries through a separate contact channel, which can be different from the channel for service delivery and apart from the actual service content. The service content is determined and prepared by the enterprise application server, which then pushes the prepared service content to the application layer broker through a secure service delivery mechanism. The application layer broker encodes the delivered content with user and device identifiers and additional authentication information such that the service content may only be accessed by the requesting user device. Thus, only the intended user and the authorized device can access the delivered content.

According to a further aspect of the invention, the application layer broker provides adaptation to various user devices and the various capabilities associated with each user device. This independence is achieved in the present invention through the use of XML for content generation and XSL Transformations (XSLT) for content presentation. The enterprise application generates content that is free of any formatting related information in the form of generic XML documents. The content is then transformed to a format suitable for presentation on the target device. This transformation occurs at run-time when the user device requests retrieval of the content. The decoupling of the wireless devices and the application server by the application layer broker also allows the wireless technologies associated with the wireless devices to be upgraded independently from upgrades in the application server.

A more complete understanding of the present invention, as well as further features and advantages of the present invention, will be obtained by reference to the following detailed description and drawings.

DETAILED DESCRIPTION

Figure 1:
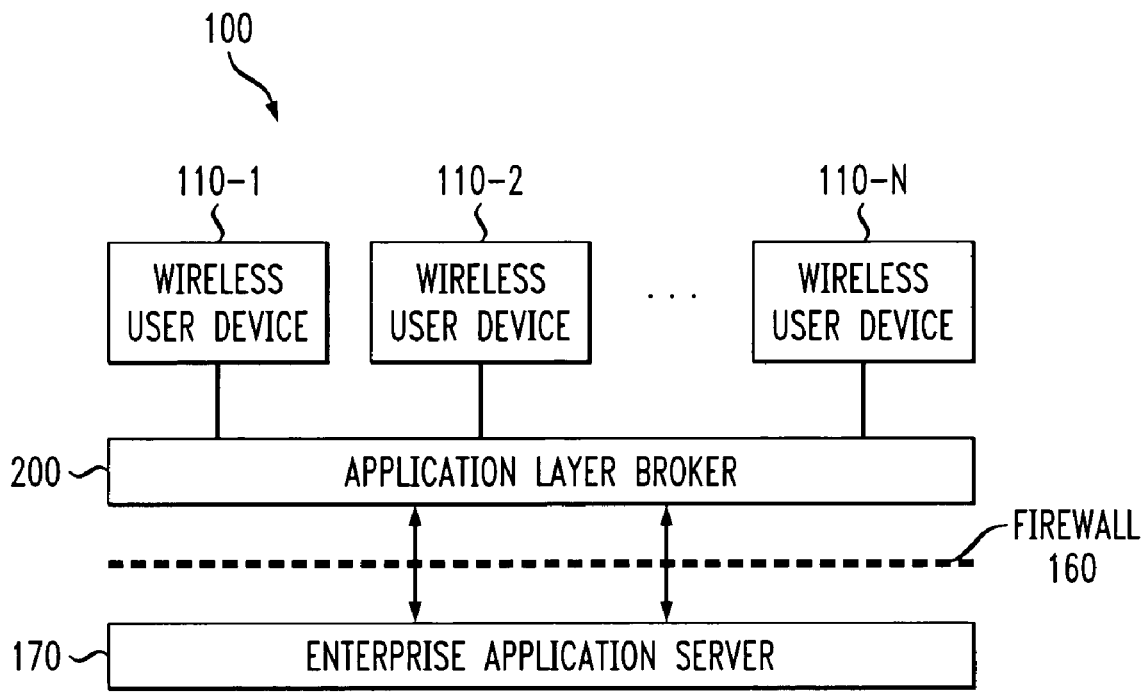
FIG. 1 illustrates a wireless multimedia communication system in which the present invention can operate.

The present invention provides a method and apparatus for the secure delivery of converged services to users of wireless devices in a wireless environment FIG. 1 illustrates a wireless multimedia communication system 100 in which the present invention can operate. As shown in FIG. 1, the exemplary wireless multimedia communication system 100 includes one or more wireless user devices 110-1 through 110-N that each communicate with an application server 170 over one or more wireless links. The application server 170 delivers one or mow wireless applications to the wireless devices 110. While the connection to each wireless device 110 includes a wireless connection, the wireless multimedia communication system environment 100 may include additional wired or wireless portions in the end-to-end path between a given wireless device 110 and the application server 170.

According to one aspect of the invention, the wireless multimedia communication system 100 includes an application layer broker 200, discussed below in conjunction with FIG. 2, that provides an indirect coupling between the enterprise application server 170, which is protected by the enterprise security firewall 160, and the wireless devices 110-1 through 110-N (clients), which typically reside outside the firewall 160. The application layer broker 200 links the wireless multimedia communication system 100 to the enterprise application server 170 through an event triggered content delivery mechanism without providing a direct link between the client wireless device 110 and the enterprise application server 170. The application layer broker 200 is located between the wireless devices 110 (client) and the server 170. This architecture differs from traditional client-server architectures in several ways First, the disclosed architecture decouples the direct connection between the client and the server. In addition, the disclosed architecture separates the service logic from the service delivery through the application layer broker 200, and provides a secure broker infrastructure between the end user devices and the enterprise level applications that contain the service logic.

Figure 3:
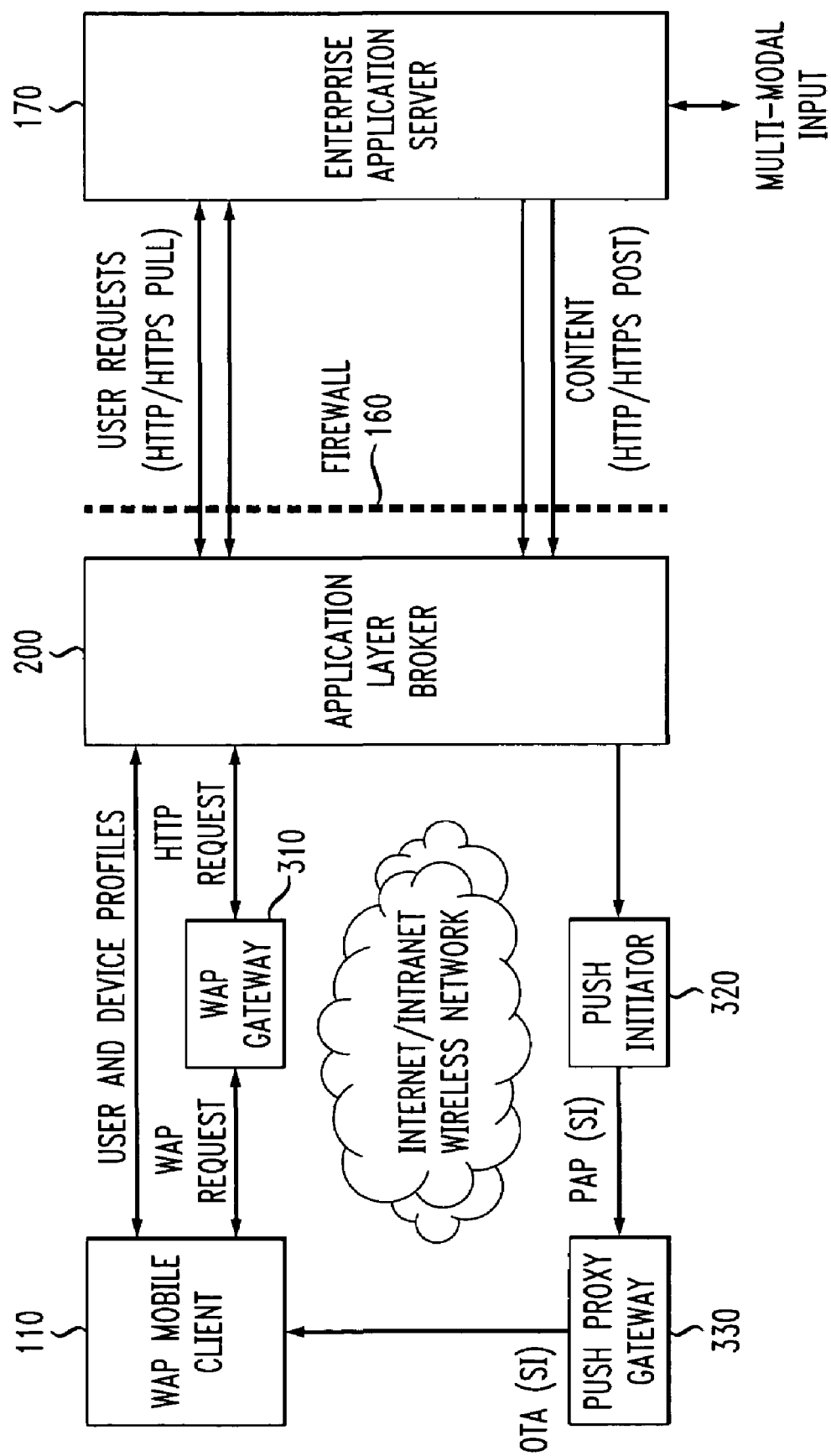
FIG. 3 is a schematic block diagram illustrating the wireless multimedia communication system of FIG. 1 in further detail.

The event triggered content delivery mechanism illustrated in FIGS. 1 and 3 allows the enterprise application server 170 to perform service logic functions, such as user authentication, dialogue interaction, and service queries, through a separate contact channel, which can be different from the channel for service delivery and apart from the actual service content. The service content will be determined and prepared by the enterprise application server 170. The enterprise application server 170 pushes the prepared service content to the application layer broker 200 through a secure service delivery mechanism such as HTTPS that can use SSL (Secure Socket Layer) as its access protocol. The application layer broker 200 encodes the delivered content with user ID, device ID and the additional authentication information from the enterprise application server 170 obtained through the contact channel. Therefore, the service content becomes only accessible by the particular user device and the particular user that triggers the content delivery from the enterprise application server 170. The application layer broker 200 is the place where the authorized wireless device (client) 110 can access the particular service content delivered from the enterprise application server 170 that matches the specific triggering event originated from the particular wireless device 110.

Among other functions, the application layer broker 200 provides adaptation to various user devices 110 and the various capabilities associated with each user device 110, as discussed further below.

In this manner, the application layer broker 200 decouples the end-user space of each wireless device 110 from the application space of the application server 170. Thus, the wireless technologies associated with each wireless device 110 may be upgraded independently from any upgrade in the application server 170. The decoupling performed by the application layer broker 200 effectively separates the service control, such as user registration and authentication, from the service delivery (e.g., the delivery of media). This separation also provides additional levels of security and reliability at the application level. Furthermore, as discussed hereinafter, content generation is separated from content presentation.

According to another aspect of the invention, discussed further below in conjunction with FIG. 2, the wireless devices 110 and the application server 170 communicate with each other through loosely coupled interfaces based on an asynchronous exchange of messages. In this manner, the present invention provides a loosely-coupled adaptable brokerage-based software (LABS) architectural framework. In addition, the wireless multimedia communication system 100 generates, transmits, and processes content in an asynchronous manner. As discussed further below in conjunction with FIG. 3, communications between the wireless devices 110 and the application layer broker 200, as well as the communication between the application layer broker 200 and the application server 170 are based on standard protocols. Among other benefits, standardized protocols, such as the eXtensible Markup Language (XML), Hyper Text Transport Protocol (HTTP), or Hyper Text Transport Protocol Secure (HTTPS), provide improved portability and interoperability.

As shown in FIG. 1, a firewall 160 protects the application server 170. Since the application server 170 is behind a firewall 160, and communicates only with the application layer broker 200, external access or unauthorized control of the enterprise application server 170 is prevented. Moreover, even the limited communication with the application layer broker 200 is initiated only by the enterprise application server 170. In addition, the communication of the service content from enterprise application server 170 and application layer broker 200 can be further restricted to a one-way push from the application server 170 to the application layer broker 200. Any communication between the enterprise application and the secure broker has to be initiated by the enterprise application that is behind the firewall 160, thus denying any external system the ability to control the enterprise application. All forms of application control, therefore, lie entirely with the enterprise application. Furthermore, sensitive data is stored persistently only with the enterprise application server 170.

Figure 2:
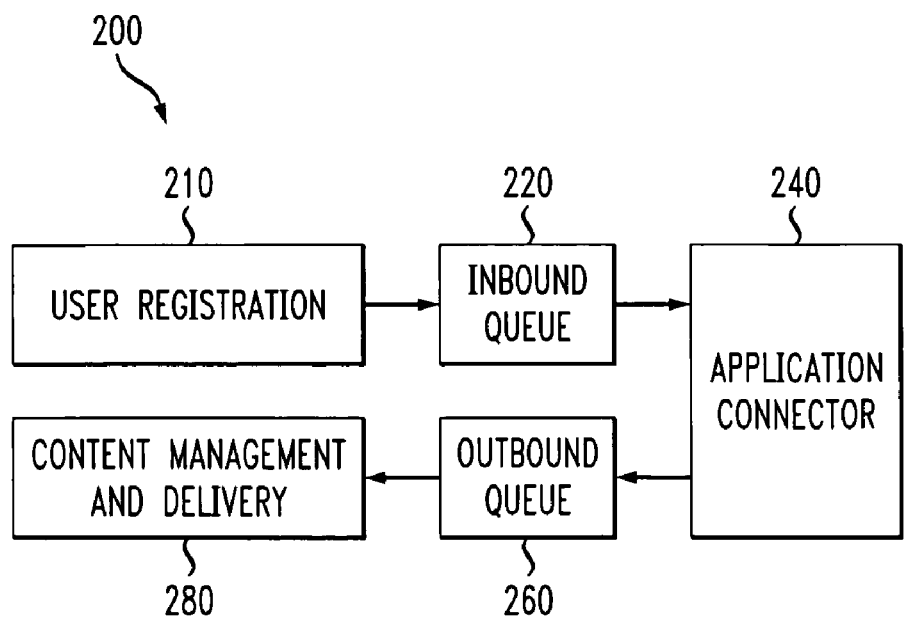
FIG. 2 is a schematic block diagram of an exemplary application layer broker of FIG. 1.

FIG. 2 is a schematic block diagram of the application layer broker 200 of FIG. 1. As indicated above, the application layer broker 200 facilitates an asynchronous mode of interaction and loosely coupled interfaces between the enterprise application 170 and the application layer broker 200 and wireless devices 110, as well as between the various components within these subsystems. As shown in FIG. 2, the application layer broker 200 includes a user registration server 210, an inbound message queue 220, an application connector 240, an outbound message queue 260 and a content management and delivery component 280. The user registration server 210 handles user registrations, authentications and requests, collectively referred to as "service control requests." The content management and delivery component 280 coordinates the delivery of multimedia content to the wireless devices 10. The minimal communication between components is achieved through the first-in-first-out message queues 220, 260. Additional security is obtained by storing data in the queues 220, 260 until retrieved by a client or until a message expiration time is reached.

The first time a user attempts to access services, the user needs to register the device 110 with the desired enterprise application server 170. During a registration phase, the user initially registers the device 110 through the user registration server 210. The user registration server 210 collects the device ID, device information and other application related user information, and puts this collected information into the inbound queue 220. The inbound queue 220 stores the information temporarily. The enterprise application server 170 queries the application connector 240 for the registration information, thereby asynchronously pulling the registration information from the application connector 240 in a secure manner. The application connector 240, upon request of the application server 170, fetches the information from the inbound queue 220, and sends the registration information to the application server 170.

For content delivery, the application server 170 prepares the content based on the authenticated user request and push the prepared content to the application connector 240 which resides in the application layer broker 200. The application connector 240, after receiving the content, places the content into the outbound queue 260. The outbound queue 260 stores the content temporarily. The content delivery management component 280 manages the content access on the outbound queue 260 when contacted by the user device 110. FIG. 3 is a schematic block diagram illustrating the wireless multimedia communication system 100 of FIG. 1 in further detail. As shown in FIG. 3, the wireless devices 110 communicate with the application layer broker 200 in accordance with the Wireless Application Protocol (WAP) in the exemplary embodiment, by means of a WAP Gateway 310. Generally, the WAP Gateway 310 converts the hypermedia transfer service between the datagram-based protocols (WSP, WTP, WTLS, WDP) and connection-oriented protocols commonly used in the Internet (HTTP, SSL, TCP). In WAP 2.0, WAP Proxy is used to establish a connection-oriented tunnel to Web server and to provide end-to-end security between mobile terminal and origin server. For additional details, see WAP Architecture: Wireless Application Protocol Architecture Specification, WAP-210-WAPArch-20010712 (2001), incorporated by reference herein. The wireless devices 110 request resources using a Web-based paradigm of requesting a resource on the server by identifying the requested resource using a Uniform Resource Interface (URI).

As shown in FIG. 3, any communication between the application server 170 and the application layer broker 200 uses the HTTP/HTTPS protocol in the exemplary embodiment. The application layer broker 200 and the enterprise application 170 exchange XML messages. It is noted that VoiceXML supports the HTTP/HTTPS protocols for fetching resources or documents, and URIs, including those related to enterprise communication services.

In an alternate implementation, messages can be exchanged in accordance with the Simple Object Access Protocol (SOAP). A SOAP implementation allows the registration connector to post a registration record as soon as a registration is complete, to the enterprise application, through a SOAP-based invocation on the enterprise application. This would eliminate the need for the enterprise application having to keep polling the registration connector. Moreover, the exchange could still have taken place over the HTTP/HTTPS protocol.

As previously indicated, the enterprise application server 170 resides behind the firewall 160, prohibiting unauthorized external access. Any communication between the enterprise application server 170 and the application layer broker 200 has to be initiated by the enterprise application, thus denying any external system the ability to control the enterprise application. All forms of application control, therefore, lie entirely with the enterprise application. Since a message preferably cannot be posted to the enterprise application, a possible approach is to put any error messages in a queue, and let the enterprise application poll periodically for such error messages. When requested, these messages can be fetched from the queue and combined to form a list that can be delivered to the requesting application. The XML document containing the generated content is posted by the enterprise application (using an HTTP/HTTPS Post) to the application connector module 240 on the application layer broker 200. This message post is done in a standard manner over HTTP/HTTPS. Since the transmitted message is a standard XML document, the application connector module 240 can validate the message against a schema that has been previously agreed upon by both the sending and receiving sides. An invalid message may simply be discarded or the sending application may be notified about the error through a suitable means.

The Push Proxy Gateway (PPG) is the entity that performs most of the functions in the WAP Push architecture. The responsibilities of the PPG range from being an access point for content pushes from the Internet to the mobile network, to everything associated therein (e.g. authentication, security and client control). As the PPG is the entry point to a mobile network, the PPG decides gateway access policies about who is able to gain access to the WAP network, who is able to push content and under what operation circumstances and parameters. For a more detailed discussion of PPG, see, for example, WAP Architecture: Wireless Application Protocol Architecture Specification, WAP-210-WAPArch-20010712 (2001), incorporated by reference herein.

Push Access Protocol (PAP) is built on XML and transported using, e.g., HTTP and SMTP. PAP can deliver the following three types of content:

1) Service Indication (SI): this content type consists of asynchronous notifications. At its most basic, an SI contains a brief message and a URI specifying a service. The wireless client can either start the service immediately or store it for later action;
2) Service Loading (SL): this content type allows a user agent on a user device to load and execute a service, specified by a URI, without user intervention; and
3) Cache Operation: this content type makes it possible to invalidate content objects in the wireless client's cache.

For a detailed discussion on the operation of the Push Access Protocol, see, for example, WAP Push Architectural Review: Wireless Application Protocol Push Architectural Review (1999), incorporated by reference herein.

One security aspect of the invention provides access to the content by only the intended user and the authorized device 110. As shown in FIG. 3, content is delivered in the exemplary embodiment to the wireless device 110 through a two-step procedure. First, a service indication (SI) message is sent to the device 110, using the Over the Air (OTA) Service Indication (SI) protocol. The service indication mechanism in the present invention consists of a short text message and a URI link that is ready to be accessed by the device 110 on the acceptance of the service indication to retrieve the service content. Then the user can access (i.e. pull) the content by following the received URI. This URI link includes a unique message identifier and a timestamp, which will be verified to prevent unauthorized access. Moreover, the information about the URI link, the physical location of the service content, and the procedure to establish the content pulling connection between the wireless device 110 and application layer broker 200 are all encoded underneath the SI protocol, which are invisible to the third party or even the user. It makes the present invention safe to use in a crowded area with people standing by, such as sitting in a bus or an airplane. This has been a security concern with prior implementations, such as service delivery using SMS (short message service) where sensitive service content information or the URL link may be displayed explicitly on the screen, without the encoding mechanism embodied in the present invention.

This mechanism also leads to an enhanced user experience for one-key operation without requiring the user to enter the phone number or the URI link in order to retrieve the service content, which is time consuming, error prune, unfit for one hand operation, and a tedious if not impossible task on a small-sized device with a standard T-9 keypad, where each key can represent multiple characters. In addition, security is enhanced by allowing the content to exist only for a certain period of time, which can be easily configured, as would be apparent to a person of ordinary skill in the art. After the expiration period for a message elapses, the message is automatically deleted. This avoids persistence of the message in an insecure environment.

As previously indicated, the application layer broker 200 provides adaptation to various user devices 110 with various functionalities. The integration of the WAP Push Access Protocol in the present invention allows an application to query the WAP Push Proxy Gateway (PPG) for the capabilities of a specific device. This operation is referred to as the Client Capabilities Query (CCQ) in WAP Push Access Protocol. The query message is an XML document that specifies the client for which the capabilities are desired. The response is a multipart/related document containing the actual client capabilities information in Resource Description Framework (RDF) format. Resource Description Framework (RDF) is an XML standard from W3C for processing metadata; it provides interoperability between applications that exchange machine-understandable information on the Web (see, Resource Description Framework (RDF) Model and Syntax Specification, W3C Recommendation, http://www.w3c.org/RDF/). Since both the Client Capabilities Query request message and the response are in XML, it provides ease in terms of formulating the query and processing the responses using standard XML API's such as Document Object Model (DOM) and Simple API for XML (SAX).

The enterprise application generates the content to be delivered to the users. However, with the proliferation of varieties of mobile devices, it would be a difficult and tedious task to modify the content generation logic for every new device that must be handled by the application. Frequent modifications to the content generation logic can only be avoided if the application does not make any assumptions about the kind of devices it generates content for. This means that the content should be independent of any presentation-related information.

This independence is achieved in the present invention through the use of XML for content generation and XSL Transformations (XSLT) for content presentation. The enterprise application generates content that is free of any formatting related information in the form of generic XML documents. The content is then transformed to a format suitable for presentation on the target device. This transformation occurs at run-time when the user device requests retrieval of the content. Contrary to when presentation information is hard-coded into the content, separation of presentation from content allows for the same data to be presented in different ways. This offers the following advantages for application adaptability:

1. Reuse of fragments of data: the same content should look different in different contexts;
2. Multiple output formats: different media (text, audio), different sizes (mobile phones, PDA's), different classes of output devices (workstations, hand-held devices); and
3. Styles tailored to the user's preference (e.g., accessibility).

Detection of user device capabilities offers the opportunity to generate customized service content that takes full advantage of the device capabilities. At the same time, for a device with limited capabilities, the content can be customized for effective presentation within the limitations imposed by the constrained device features. For example, for a device with a color presentation screen, the content may include a color image, while for a device with only a black and white display with a small screen-size, only a small black and white image may be included.

It is to be understood that the embodiments and variations shown and described herein are merely illustrative of the principles of this invention and that various modifications may be implemented by those skilled in the art without departing from the scope and spirit of the invention.

We claim:

1. A wireless communication system, comprising:
   one or more wireless communication devices;
   at least one application server for delivering content to said one or more wireless communication devices; and
   an application layer broker between said one or more wireless communication devices and said at least one application server, wherein said application layer broker provides an indirect coupling between said at least one application server and said one or more wireless communication devices; and
   an event-triggered content delivery mechanism, wherein said event-triggered content delivery mechanism receives requests to transfer said content, transfers said content from said application server to said application layer broker, and generates an event notification to at least one of said wireless communication devices, wherein said event notification provides said indirect coupling and includes linkage information to allow said at least one of said wireless communication devices to access said content from said application layer broker.

2. The wireless communication system of claim 1, wherein said at least one application server is protected by a firewall and said one or more wireless communication devices are outside of said firewall.

3. The wireless communication system of claim 1, wherein communications between said application server and said application layer broker are initiated only by said application server.

4. The wireless communication system of claim 1, wherein said application layer broker links said one or more wireless communication devices to said application server through said event triggered content delivery mechanism.

5. The wireless communication system of claim 4, wherein said event triggered content delivery mechanism allows said application layer broker to provide separate channels for a registration of said wireless communication device and a delivery of said content to said wireless communication device.

6. The wireless communication system of claim 4, wherein said event triggered content delivery mechanism temporarily stores collected device intimation in a queue to be obtained by said application server.

7. The wireless communication system of claim 6, wherein said application server performs a query to obtain said collected device information.

8. The wireless communication system of claim 1, wherein said application layer broker provides adaptation to a plurality of said wireless communication devices.

9. The wireless communication system of claim 8, wherein said adaptation to a plurality of said wireless communication devices is performed by dynamically binding a device capability query with a generation and presentation of said content.

10. A wireless communication system for providing content from an application server to a wireless communication device, comprising:
   an application layer broker between said wireless communication device and said application server, wherein said application layer broker provides separate channels for a registration of said wireless communication device and a delivery of said content to said wireless communication device; and
   an event-triggered content delivery mechanism, wherein said event-triggered content delivery mechanism receives requests to transfer said content, transfers said content from said application server to said application layer broker, and generates an event notification to said wireless communication device, wherein said event notification provides said indirect coupling and includes linkage information to allow said wireless communication device to access said content from said application layer broker.

11. The wireless communication system of claim 10, wherein said application layer broker links said one or more wireless communication devices to said application server through said event triggered content delivery mechanism.

12. The wireless communication system of claim 11, wherein said event triggered content delivery mechanism allows said application layer broker to provide separate channels for a registration of said wireless communication device and a delivery of said content to said wireless communication device.

13. The wireless communication system of claim 11, wherein said event triggered content delivery mechanism temporarily stoics collected device information in a queue to be obtained by said application server.

14. The wireless communication system of claim 13, wherein said application server performs a query to obtain said collected device information.

15. The wireless communication system of claim 10, wherein said at least one application server is protected by a firewall and said one or more wireless communication devices are outside of said firewall.

16. A method performed by an application layer broker for delivering content to a wireless device from an application server, comprising:
   receiving a request from a user associated with said wireless device for said content;
   providing said request to said application server, wherein said request is event triggered;
   receiving said content from said application server;
   encoding said content with authentication information so that said content may only be accessed by said wireless device;
   generating an event notification to said wireless device, wherein said event notification provides said indirect coupling and includes linkage information to allow said wireless device to access said content from said application layer broker; and
   providing said encoded content for access by said wireless device.

17. The method of claim 16, wherein said application server pushes a service to said application layer broker through a secure service delivery mechanism.

18. The method of claims 16, further comprising the step of temporarily placing said content in a queue for delivery to said wireless device, wherein said content is fetched from said queue for delivery to said wireless device.

19. The method of claim 16, wherein said application layer broker provides adaptation to a plurality of wireless communication devices.

20. The method of claim 19, wherein said adaptation to a plurality of said wireless communication devices is performed by dynamically binding a device capability query with a generation and presentation of said content.

* * * * *